Dec. 15, 1964 L. N. HALE ETAL 3,161,883

INDEXING AND MAGNETIZING DEVICE FOR DATA STORAGE CARD

Filed June 15, 1962 3 Sheets-Sheet 1

INVENTORS
LESLIE N. HALE
JAMES N. TRACEY
KENNETH E. WOOD

BY H. H. Losche
Paul S. Collignon
ATT'YS.

Dec. 15, 1964 L. N. HALE ETAL 3,161,883

INDEXING AND MAGNETIZING DEVICE FOR DATA STORAGE CARD

Filed June 15, 1962 3 Sheets-Sheet 2

INVENTORS
LESLIE N. HALE
JAMES N. TRACEY
KENNETH E. WOOD
BY
H. N. Loeche
Paul S. Collignon
ATT'YS

INDEXING AND MAGNETIZING DEVICE FOR DATA STORAGE CARD

Filed June 15, 1962 3 Sheets-Sheet 3

INVENTORS
LESLIE N. HALE
JAMES N. TRACEY
KENNETH E. WOOD
BY H. H. Loesche
Paul S. Collignon
ATT'YS.

3,161,883
INDEXING AND MAGNETIZING DEVICE FOR DATA STORAGE CARD

Leslie N. Hale, Glen Burnie, James N. Tracey, Baltimore, and Kenneth E. Wood, Severna Park, Md., assignors, by mesne assignments, to the United States of America as represented by the Secretary of the Navy Filed June 15, 1962, Ser. No. 203,431
2 Claims. (Cl. 346—74)

The present invention relates to a device for selectively magnetizing magnetic bits on flat storage cards.

Various methods of storing information which is later to be retrieved are employed in the computer art. One type of computer uses simple toroidal magnetic cores that have properties suitable for digital storage application. In another type of computer, data storage cards are used in the memory circuit. Data is stored on pairs of small blocks of magnetizable material that are part of the storage card. A magnetizing current, which is selectively applied to the blocks of magnetizable material, converts the material into a permanent magnet. In the read-out of the information, the presence of a magnet may represent a logical "0," and an absence of a magnet might represent a logical "1."

The present invention relates to a device for selectively magnetizing a group of blocks of magnetizable material on a data storage card. A multiple channel magnetizing head is attached to a frame in such a manner that it can be raised and lowered. The data storage card that is to be processed is mounted on a slidable carriage that positions the card beneath the magnetizing head such that a complete row of blocks can be processed at one time. A handwheel is provided which, upon turning, causes the magnetizing head to be raised and at the same time moves the slidable carriage so that the data storage card will be moved to a new position. The slidable carriage is moved by means of a gear train, however, the final position of the carriage is determined by a positioning wheel that engages in a V-slot on the carriage. This arrangement prevents any accumulation of error due to backlash in the driving gear train.

It is therefore a general object of the present invention to provide an improved device for selectively magnetizing a plurality of magnetizable blocks on a data storage card.

Another object of the present invention is to provide an indexing device for selectively positioning a data storage card beneath a magnetizing head.

Still another object of the present invention is to provide means for simultaneously raising a magnetizing head and moving a data storage card to another position.

Other objects and advantages of the present invention will be readily appreciated as the same becomes better understood by reference to the following detailed description when considered in connection with the accompanying drawings wherein.

Figure 1:
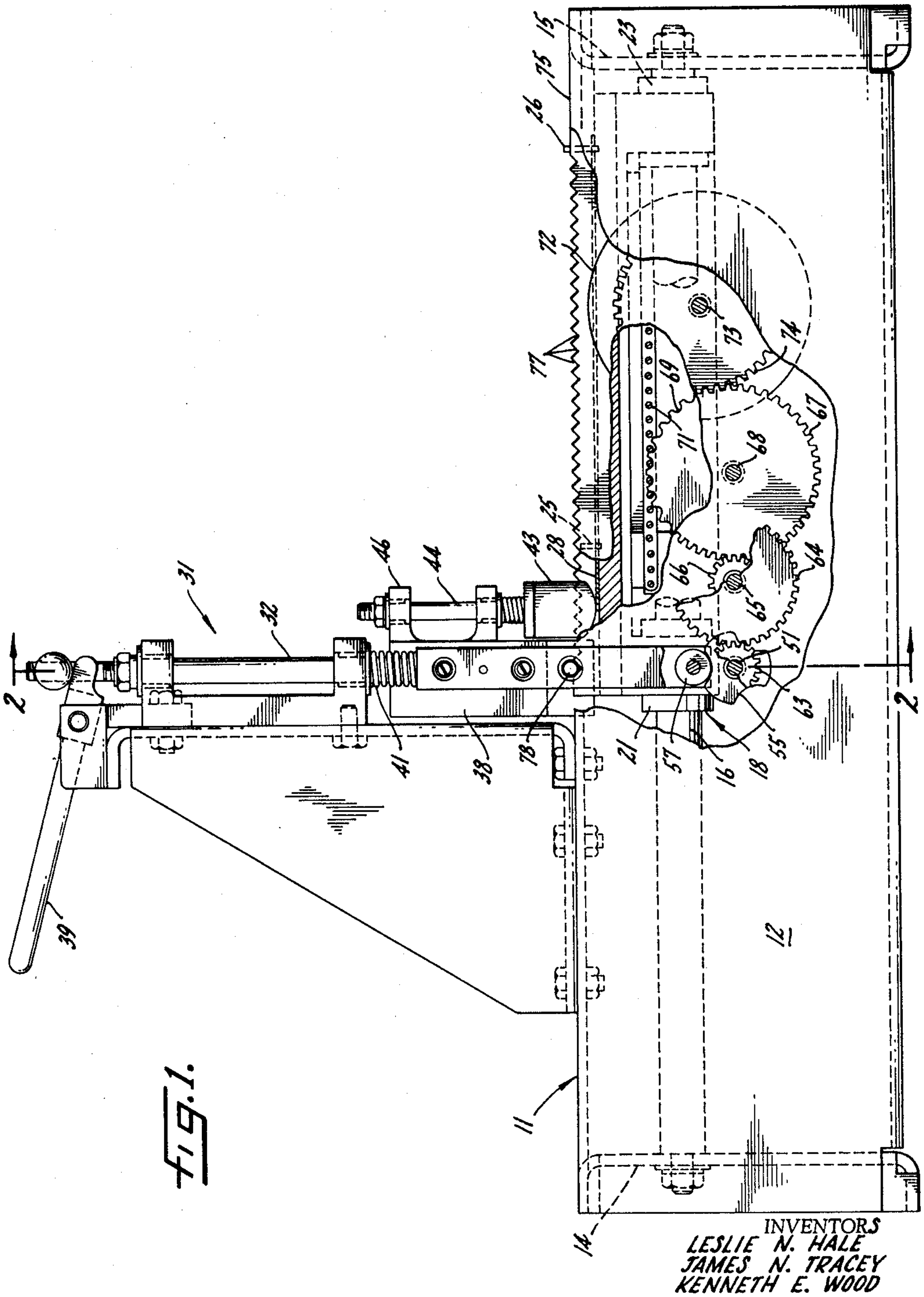
FIGURE 1 is a side view, partially broken away, showing a preferred embodiment of the present invention.

Referring now to the drawings, there is shown a frame which is generally designated by number 11 and which is comprised of side plates 12 and 13 and end plates 14 and 15. A pair of rods 16 and 17 are attached, in a parallel relationship, to end plates 14 and 15 at a distance from the top edge of said end plates of approximately one-fourth the height of said plates. A carriage 18 is slidably mounted on rods 16 and 17 by means of ball bushings 21–24, inclusive. A pair of pins 25 and 26 are provided on the flat bed portion 27 of carriage 18 and these pins position a card 28 that is to be processed.

An upstanding frame 31 is attached to frame 11 and a pair of shafts 32 and 33 are slidably mounted in bushings 34–37, inclusive, which are press-fitted in upstanding frame 31. Shafts 32 and 33 are each provided with an enlarged diameter portion and these two enlarged diameter portions are connected together by means of a plate 38 so that the two shafts move in unison. A lever 39, which is pivotally connected to the upstanding frame 31, engages shafts 32 and 33 and can be used to raise the shafts in unison. Helical springs 41 and 42 are provided around shafts 32 and 33, respectively, and are positioned between the lower pair of bushings and the enlarged diameter portions of the shafts. A multi-channel magnetizing head 43 is attached to plate 38 by means of shafts 44 and 45 which pass through U-shaped protrusions 46 and 47, which are on plate 38.

Figure 2:
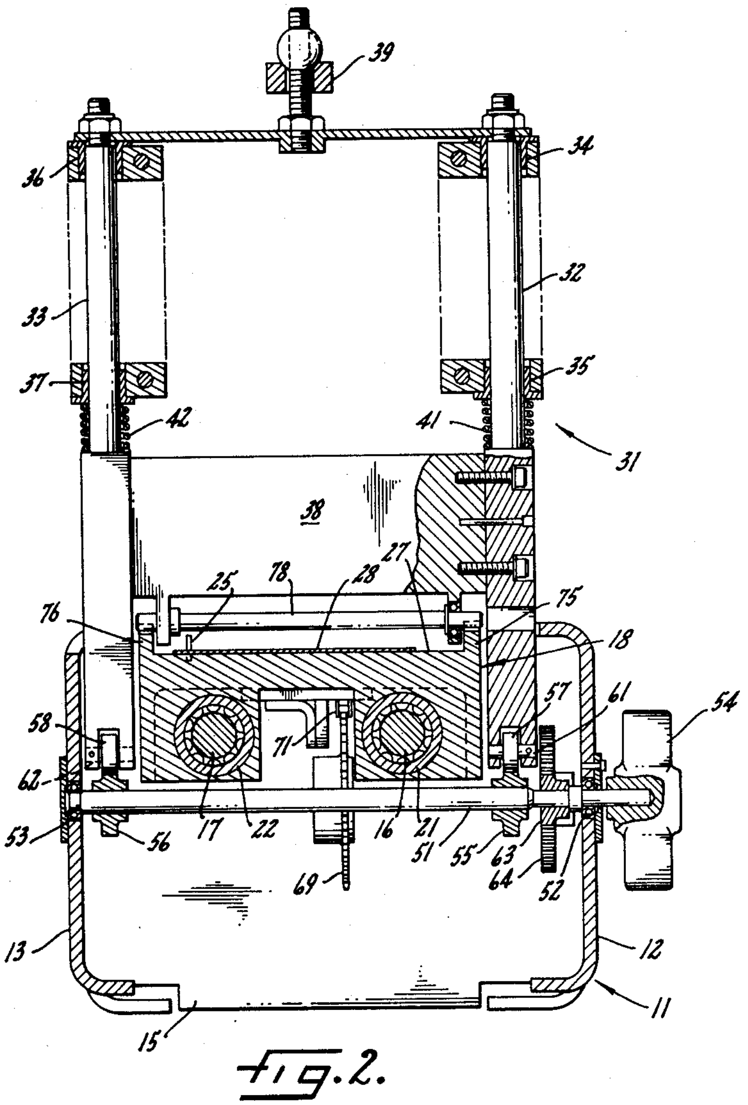
FIGURE 2 is a sectional view taken on line 2—2 of FIGURE 1.
Figure 3:
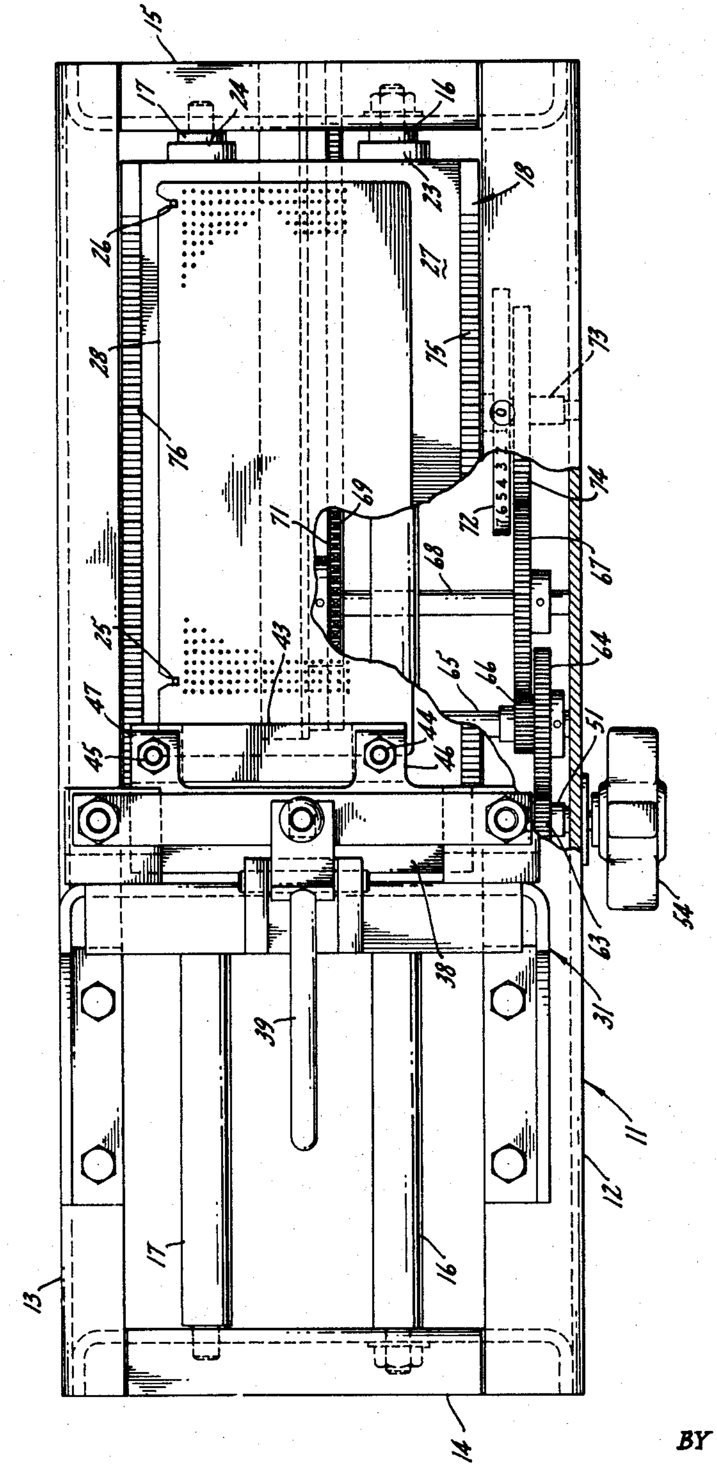
FIGURE 3 is a top view of the preferred embodiment shown in FIGURE 1.

Referring now particularly to FIGURES 1 and 2 of the drawings, it can be seen that a drive shaft 51 is rotatably supported in bearings 52 and 53 that are mounted in side plates 12 and 13, respectively. A portion of drive shaft 51 extends outside end plate 12 and a knob 54 is attached to this portion of the shaft. Cams 55 and 56 are attached to drive shaft 51 and engage with followers 57 and 58, respectively, which by way of example, might be ball bearings. Followers 57 and 58 are rotatably attached to shafts 32 and 33, respectively, by means of pins 61 and 62. As best shown in FIGURES 1 and 3 of the drawings, a gear 63 is mounted on drive shaft 51 and this gear meshes with gear 64, which is mounted on shaft 65. A second gear 66 is also mounted on shaft 65 and this second gear 66 meshes with gear 67 which is mounted on shaft 68. A sprocket gear 69, which is located approximately in the middle of shaft 68, engages a sprocket chain 71 which is stationarily attached to the underside of carriage 18. It can thus be seen that rotation of knob 54 causes rotation of cams 55 and 56 and a rise portion on these cams raises shafts 32 and 33, which in turn, causes the multi-channel magnetizing head 43 to be raised. At the same time, sprocket 69 is being rotated through the gear train and the data storage card 28, which is carried on carriage 18, is being moved to a different position. A column indicator 72 is provided to show which column of the data storage card 28 is positioned beneath the magnetizing head 43. Indicator 72, which is positioned on shaft 73, is rotated when gear 74 is driven by gear 67.

Carriage 18 is provided with two upward extending flanges 75 and 76 that are provided with a plurality of V-notches 77. A positioning shaft 78, which is rotatably attached to plate 38, is engageable with the V-notches. The spacing between adjacent V-notches corresponds to the spacing between adjacent rows of blocks of magnetizable material which are provided on card 28. The relationship between pins 25 and 26 and the V-notches 77 is such that when a card 28 is positioned on the bed portion 27 of carriage 18, and when positioning shaft 78 is cradled in a V-notch in flanges 75 and 76, a row of blocks of magnetizable material will be positioned beneath the magnetizing head 43.

In operation, a card 28 that is to be processed is positioned on the bed portion 27 of carriage 18 by the pins 25 and 26 that fit into locating notches that are provided on the edge of card 28. Lever 39 is then depressed which raises the multi-channel magnetizing head 43, and carriage 18 is moved, by rotating knob 54, until positioning shaft 78 engages the first V-notches in flanges 75 and 76, as shown in FIGURE 1 of the drawings. Magnetizing head 43 is then lowered into contact with card 28 and then magnetizing head 43 is energized to convert the desired blocks of magnetizable material into magnets. By way of example, there may be 26 pairs of magnetizable material blocks in each row of the card, and accordingly, there would then be 26 channels in magnetizing head 43. If a pair of magnetizable material blocks are magnetized by head 43, the resulting magnet would represent a logical "0" and an absence of a magnet would represent a logical "1."

After the first row of blocks of magnetizable material is selectively magnetized, knob 54 is rotated in a counterclockwise direction and this rotation simultaneously raises positioning shaft 78 and magnetizing head 43 and moves carriage 18 to a second position. After approximately one-third of a revolution of knob 54 positioning shaft 78 is lowered into the second set of V-notches 77, and it is this positioning shaft 78 that determines the final location of carriage 18, and consequently, the location of card 28 with respect to magnetizing head 43. It can thus be seen that the effect of any backlash in the gear train that drives carriage 18 is nullified, as it is positioning shaft 78 and the V-notches 77 that determine the location of carriage 18. As the magnetizing head 43 is in physical contact with card 28 during the energizing cycle, the head 43 is raised during the travel of carriage 18 in order to prevent any dragging of head 43 on the card 28 which could cause damage of the card 28. Indicator 72 shows the number of the row on card 28 that is positioned beneath the magnetizing head 43. When a card, which by way of example might have 32 rows of magnetizable blocks, is completely processed, lever 39 is again depressed which raises magnetizing head 43 and carriage 18 can then be returned to a loading position where the processed card can be removed and a new card placed in position.

It can thus be seen that the present invention provides an improved device for magnetizing a plurality of bits on a data storage card. The invention has a particular advantage in that the carriage holding the data storage card being processed is driven through a gear train, however, additional means are provided for positioning the card relative to a magnetizing head thereby eliminating the effect of any backlash of the gear train.

Obviously many modifications and variations of the present invention are possible in the light of the above teachings. It is therefore to be understood, that within the scope of the appended claims, the invention may be practiced otherwise than as specifically described.

We claim:

1. In an indexing system,
(*a*) a horizontally disposed frame,
(*b*) an upstanding frame attached to said horizontally disposed frame,
(*c*) first and second parallel shafts slidably attached to said upstanding frame,
(*d*) a plate connecting said first and second parallel shafts,
(*e*) a magnetizing head attached to said plate,
(*f*) a carriage slidably mounted on said horizontally disposed frame and having a plurality of V-shaped notches thereon,
(*g*) a drive shaft rotatably supported by said horizontally disposed frame,
(*h*) cam means on said drive shaft engaging said first and second parallel shafts,
(*i*) a gear train interconnecting said drive shaft and said carriage, and
(*j*) means engageable with said V-shaped notches for positioning said carriage relative to said magnetizing head.

2. In an indexing system as set forth in claim 1 wherein said means engageable with said V-shaped notches for positioning said carriage relative to said magnetizing head includes a positioning shaft rotatably supported by said plate.

References Cited by the Examiner

UNITED STATES PATENTS

| | | | |
|---|---|---|---|
| 251,476 | 12/81 | Shiras | 346—79 |
| 1,221,670 | 4/17 | Buchanan | 346—79 |
| 2,034,341 | 3/36 | Gregory et al. | 234—130 |
| 2,165,415 | 7/39 | Rindfleisch | 235—61.112 |
| 2,704,634 | 3/55 | Rauch | 346—74 |
| 2,894,798 | 7/59 | Potter | 346—74 |

IRVING L. SRAGOW, *Primary Examiner.*